May 16, 1950 T. MILLER ET AL 2,508,281
INERTIA CONTROLLED MACHINE TOOL WORKTABLE
Filed Oct. 17, 1946 3 Sheets-Sheet 1

Inventors:
Theodore Miller
Aage Jensen
Raymond E. Averturf
by Peck & Peck Attorneys

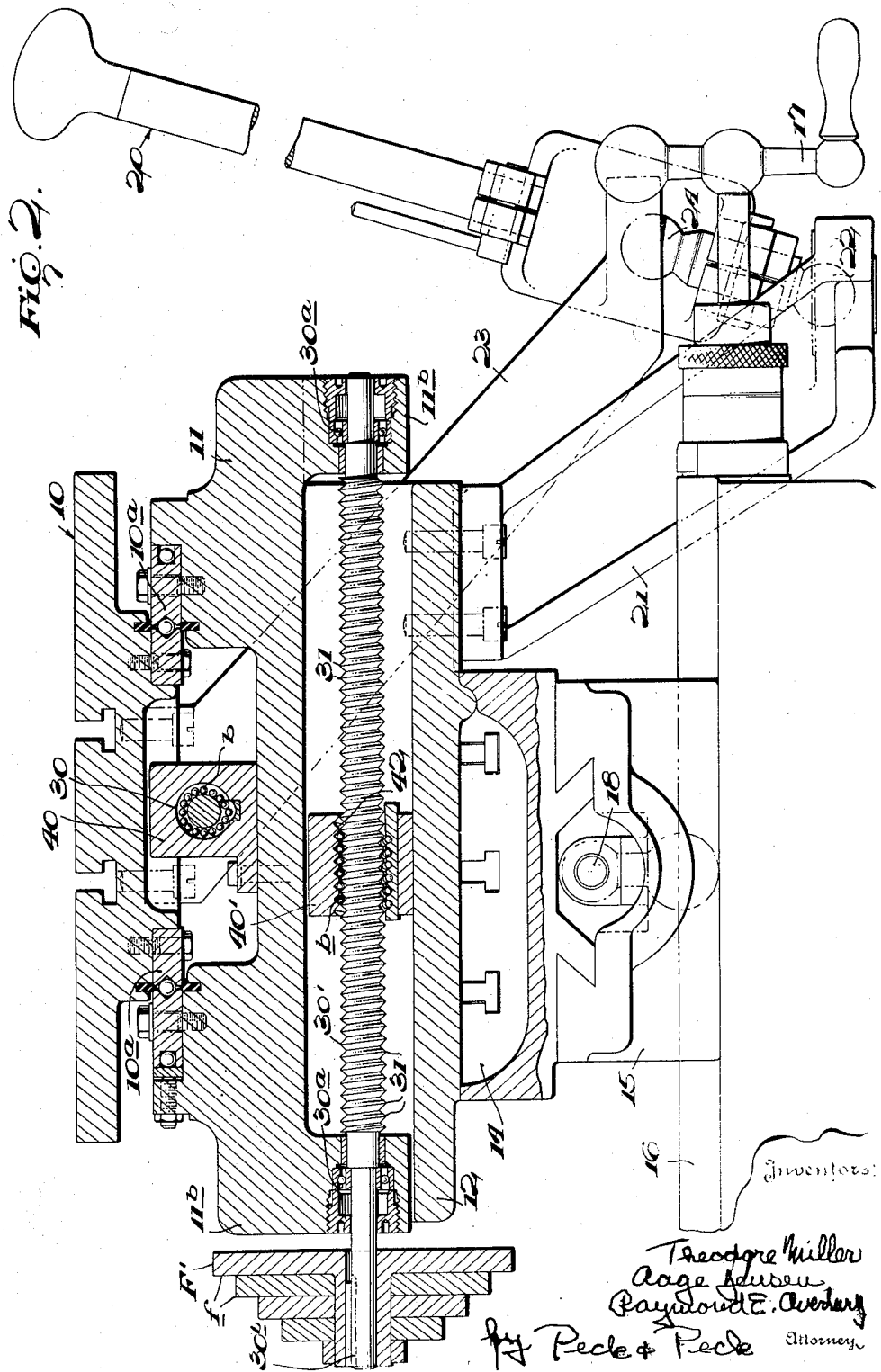

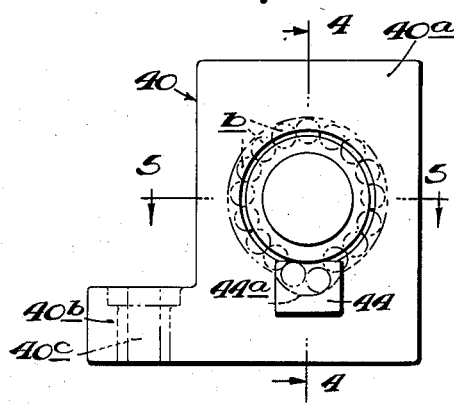
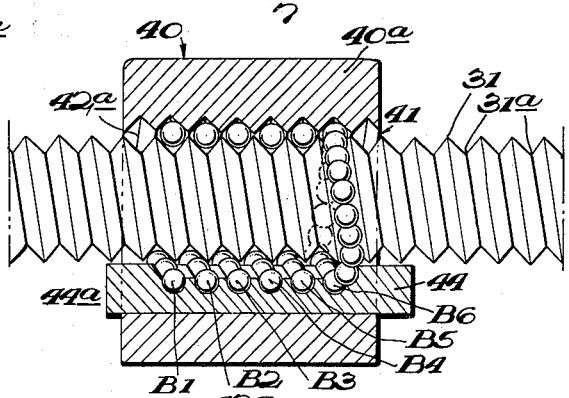
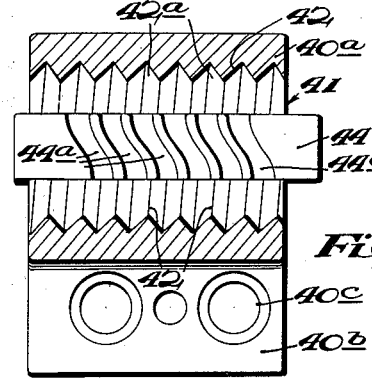
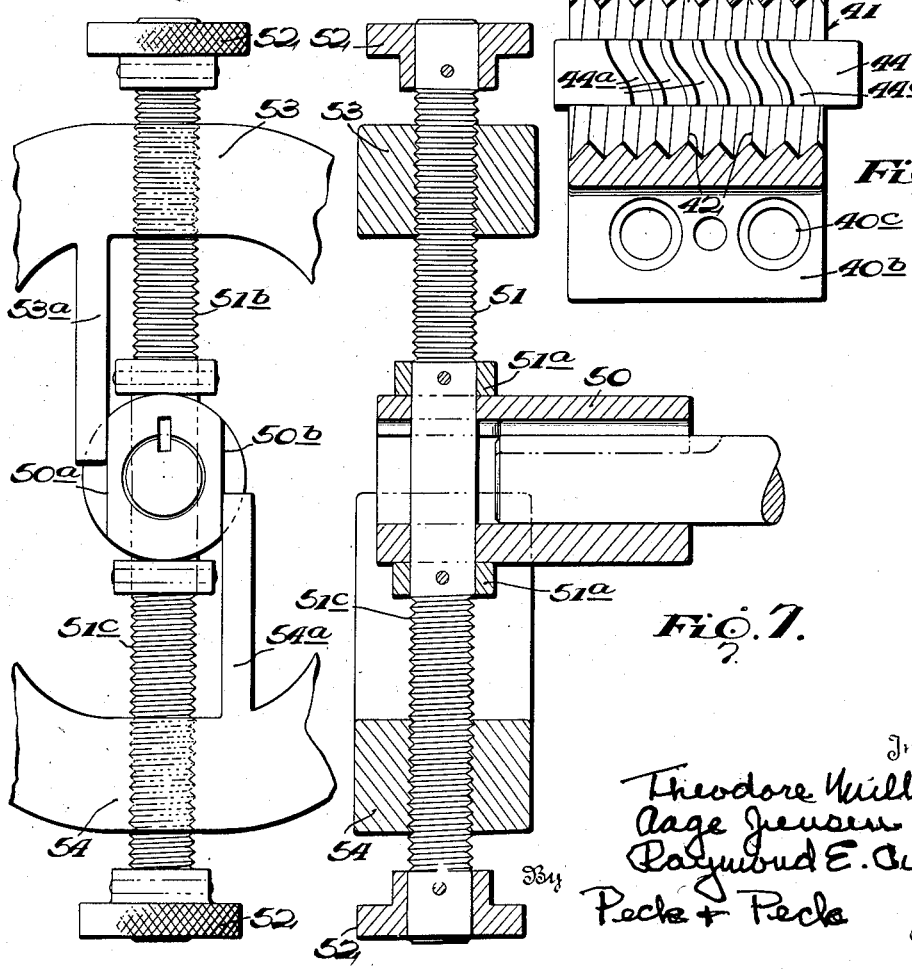

UNITED STATES PATENT OFFICE 2,508,281

INERTIA CONTROLLED MACHINE-TOOL WORKTABLE

Theodore Miller, Aage Jensen, and Raymond E. Overturf, Racine, Wis., assignors to George Gorton Machine Co., Racine, Wis., a corporation of Wisconsin Application October 17, 1946, Serial No. 703,724

3 Claims. (Cl. 90—58)

This invention relates to certain improvements in inertia controlled machine tool work tables and the like; and the nature and objects of the invention will be readily recognized and understood by those skilled in the arts involved in the light of the following explanation and detailed description of the accompanying drawings, illustrating one adaptation of the invention by way of example, from among various other adaptations, embodiments, forms, arrangements, and combinations, of which the invention is capable within the spirit and scope thereof.

Our invention is particularly directed to overcoming certain problems and difficulties encountered with machine tools of the duplicator type having manually operated and controlled work tables of the so called "sensitive" type, which problems and difficulties restrict and limit the range of operations of such machine tools and reduce the field of usefulness thereof. Such a duplicator machine tool having a work table of the so called "sensitive" type, as referred to above, is illustrated and described in the U. S. Patent 2,005,696, for machine tool, issued June 18, 1935, as assigned to George Gorton Machine Company.

The manually operated, "sensitive" type of machine tool work table in the adaptations thereof as the work table of a machine tool of the duplicator type, exemplified in the above referred to U. S. Patent 2,005,696, is essentially designed and mounted for a high degree of operational sensitivity under the manual control of an operator, in order to provide for rapid operational movements of the work table, as well as to insure a degree of sensitivity which will give the necessary "feel" for manual control and precision operation of the work table by the operator in carrying out duplicating operations on work of small dimensions with small cutting tools. However, the foregoing characteristics essential for fast operating speeds and for the necessary operator "feel" for accurate manual operation and control in performing duplicating operations on small work, renders "sensitive" type manually operable work tables impractical for efficient use on work of the larger dimensions or tougher material characteristics or with large cutters, because, due to the high sensitivity of the work table, the large manual forces required from the operator to feed the cutter through heavy work material such, for example, as steel, or to feed a large cutter through the work, make it exceedingly difficult or impossible practically for the operator to manually control the work table for accurate operations.

It is a general object of our invention to overcome the foregoing difficulties and to render these sensitive types of duplicator work tables capable of accurate and efficient manual operation and control for duplicating operations upon the larger classes of work and upon work materials of tougher characteristics and with the larger sizes of cutting tools, thus materially increasing the working range and usefulness of such types of machine tools.

In attaining the above general object, our invention is characterized by the provision of a mechanically simple and efficient design and arrangement of energy storing mechanism combined in operative association with a sensitive type machine tool work table, for actuation to store energy by the normal manual operation and control of the work table by the operator with a minimum of added effort on the part of the operator, and for continuously applying such stored energy as forces acting on the work table in the directions in which the table is being selectively motioned by the manual operation thereof, so that such applied forces act to aid the manual motioning of the table by the operator with the inertia forces developed by the mechanism functioning to regulate the rate of speed of motion of the table by resisting or opposing any sudden changes or variations in such rate of speed which may be occasioned by over or under control on the part of the operator, thus making it possible for the operator to manually control the motioning of the work table at substantially constant rates of speed of movement to feed the cutter through the work.

A further object of the invention is to provide such an energy storing mechanism for the inertia control of the work tables of machine tools, such as a sensitive type duplicator work table, which embodies a rotatable weight mass forming a flywheel in operative, controlled association with the work table, for rotation by the normal manual motioning of the work table to store energy therefrom and continuously apply such stored energy to the work table during operation thereof with the inertia forces developed by the flywheel acting to continuously resist sudden variations in the rate of speed of manual motioning of the work table.

Another object of the invention is to provide such an energy storing mechanism of the flywheel type in which rotation of the flywheel is obtained through the medium of a nut and screw arrangement in which the flywheel and screw are mounted on and carried by the work table with the screw in operative association with a non-rotary nut for translating rectilinear movements of a work table and axial movements of the screw into rotary motion of the screw to drive the flywheel.

Another object of the invention is to provide such an energy storing mechanism for the inertia control of the machine tool work table, in which the design and arrangement of the mechanism is such that a high rate of speed of rotation of the flywheel is obtained by rectilinear movements of the work table through small distances, so that the desired flywheel effect can be obtained by utilizing a flywheel of small diameter and small mass rotated at relatively high speed.

Another object of the invention is to provide such an energy storing mechanism particularly adapted for inertia control of the work table of a machine tool, which will be of simple, compact design and construction capable of being mounted and combined in a work table organization in operative association therewith without requiring major or substantial redesigning of the work table organization, and which will in mounted operative combination in the table organization, occupy a minimum of space with a minimum of exposed structure for interference with normal operation and use of the machine tool and of the table organization.

Another object of the invention is to provide for the inertia control of a manually operable work table organization of a machine tool, of a type in which the work table proper is mounted on a sub-table or slide for rectilinear movements in opposite directions on such slide, with the slide mounted for rectilinear movements in opposite directions along a path at right angles to the path of movement of the work table, so that, the work table may have universal lateral movements in one plane as a result of independent rectilinear and of compound rectilinear movements of the slide and work table, by independent energy storing mechanisms associated with the work table and the slide, respectively, so that said mechanisms are independently actuated by independent motioning of the work table and the slide, or are simultaneously actuated by compound movements of said table and slide to store energy and apply inertia forces to said table and slide as a unit throughout independent and compound movements of the table and slide as the work table is manually universally motioned.

A further object of the invention is to provide an energy storing mechanism of the flywheel type for the inertia control of machine elements having rectilinear movements, in which an actuating screw is provided for rotation to drive the flywheel element of the mechanism with the screw in such association with a nut element that axial or longitudinal movements of the screw through and relative to the nut, are translated into rotation of the screw to drive the flywheel.

A further object of the invention is to provide an energy storing mechanism of such character which, while primarily adapted for actuation by and inertia control of machine tool work tables, will be of general adaptability and utility in the mechanical arts for association with and control of a machine element having primarily rectilinear motion.

Another object of the invention is to provide such an energy storing mechanism having nut and screw actuating members of the minimum friction, ball bearing type.

A further object of the invention is to provide a nut and screw combination of the ball bearing type which will be of general utility in the machine arts, having a ball bearing nut of efficient design and construction arranged to operate with the screw through a plurality of independent series of balls for minimum friction engagement and cooperation in the threaded grooves of the screw as such screws are respectively presented to said independent series of balls by the axial and rotary movements of the screw relative to the nut.

A further object is to provide an improved design of a ball bearing nut and screw arrangement incorporating an improved device for returning the balls to the starting point of the helical paths so that such balls form a plurality of continuous series moving in closed helical paths and having return ducts of minimum length, thereby improving the anti-friction characteristics of the screw and nut arrangement.

A further object is to provide a ball bearing nut and screw arrangement incorporating a ball return duct of one-piece construction having a plurality of return channels and arranged so that these channels can be readily machined to accurate dimensions and can be positioned precisely to accurately close the plurality of interrupted helices.

With the foregoing general objects and results in view, as well as certain other objects and results in view which will be readily apparent from the following description, our invention consists in certain novel features in structure, organization and combinations, and in construction of parts and elements, as will be more fully and particularly described and specified hereinafter.

Referring to the accompanying drawings in which similar reference characters refer to corresponding parts and elements throughout the several figures thereof:

Fig. 1 is a view in front elevation of a manually operable work table organization of the sensitive type for a duplicator machine, with energy storing mechanisms or units of our invention mounted on and combined with the work table and supporting subtable or slide therefor, and showing the nut of the flywheel actuating nut and screw of the work table operated mechanism in vertical longitudinal section and the screw with the flywheel mounted thereon in side elevation, and further showing the nut and screw of the slide operated mechanism in vertical transverse section.

Fig. 2 is a view in side elevation of the organization of Fig. 1, taken from the left hand side of the machine, showing the work table operated energy storing mechanism or unit in transverse vertical section, and showing the nut of the flywheel actuating nut and screw of the slide operated energy storing mechanism or unit in vertical longitudinal section and the screw thereof with the flywheel mounted thereon in side elevation.

Fig. 3 is a view in end elevation of the ball bearing nut and screw combination of an energy storing and inertia control mechanism or unit of our invention.

Fig. 4 is a vertical longitudinal section taken as on the line 4—4 of Fig. 3, through the ball bearing nut, but with the screw therein shown in side elevation, and particularly showing the arrangement of independent series of balls engaged in the thread grooves of the screw.

Fig. 5 is a horizontal section through the ball bearing nut with the balls and screw removed, taken as on the line 5—5 of Fig. 3, to show the arrangement of ball grooves in the nut and of the ball switch plate at the lower side of the nut.

Fig. 6 is a view in side elevation of a modified form of adjustable flywheel provided with diametrically opposite, radially adjustable weights for varying the inertia effect of the flywheel.

Fig. 7 is a longitudinal section through the adjustable flywheel of Fig. 6, taken as on the vertical center-line of Fig. 6.

Figure 1:
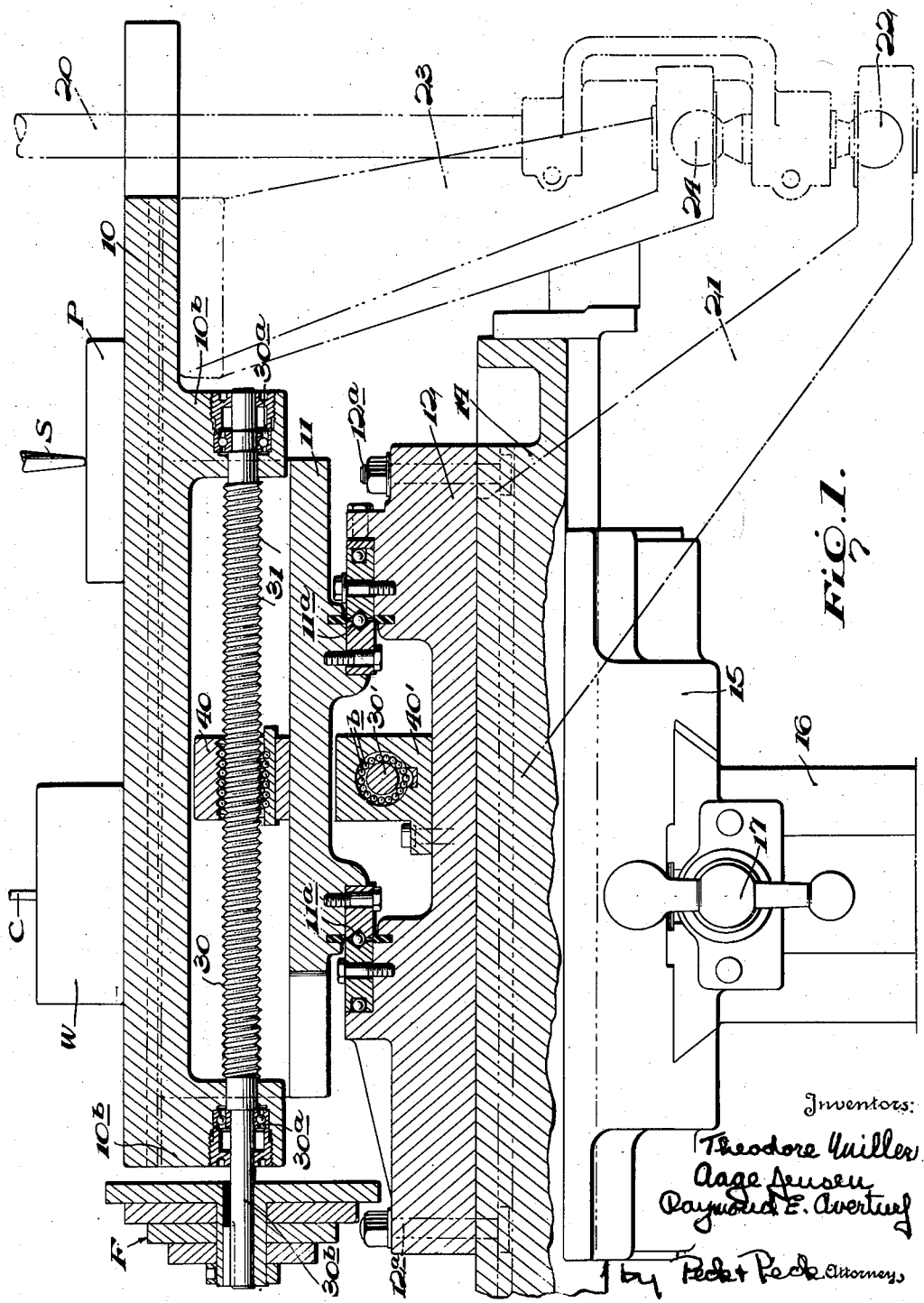

As the primary problems which our invention has overcome are presented by the sensitive type work table duplicating machine, such as illustrated and described in the above referred to U. S. Patent 2,005,696, we have selected as an example, for the purpose of illustrating and describing the principles and features of our invention, and adaptation of the invention associated in and combined with the sensitive work table organization of such a duplicating machine for effecting and imposing inertia control on such a manually operated sensitive work table organization. It has not been deemed necessary herein, to completely disclose the entire duplicating machine and the details thereof illustrated in the aforesaid U. S. Patent 2,005,696, as reference may be made to that patent for such disclosure.

While we have disclosed an adaptation and arrangement of energy storing inertia control mechanisms or units of our invention applied to and embodied with a sensitive work table organization of a duplicating machine, we do not thereby intend to limit our invention to such adaptation or to machine tools of the duplicator type, as the invention is of general utility not only in the machine tool art but in the machine arts generally, and our invention contemplates and includes various adaptations and combinations of the principles and features embodied in our energy storing inertia control mechanism or units with any movable member, element or mechanism, whether or not manually operated and controlled, in which conditions and factors are or may be present that may be overcome or improved by utilizing our invention. Hence, it is to be clearly understood that the illustrated adaptation and application of the invention is presented by way of an example and not for purposes of limitation, and the appended claims are to be so interpreted except where the context contains limitations to the selected adaptation of the invention herein disclosed.

The manually operated work table organization of the sensitive type illustrated in Figs. 1 and 2, of the accompanying drawings, for use in a duplicator type of machine tool, basically embodies a horizontally disposed work table 10, supported and slidably mounted on a sub-table or slide 11, for rectilinear movements relatively thereto, in opposite directions along a straight line path and with the sub-table or slide 11, mounted and slidably supported upon a base 12, for rectilinear movements in opposite directions along a straight line path at right angles to the path of movement of the duplicator work table 10 on such slide or sub-table. Thus, the duplicator work table 10 is movable back and forth longitudinally across the machine, independently of its supporting slide or sub-table 11; the slide 11 is movable transversely or "in" and "out," relative to the machine, independently of movement of the work table on the slide to bodily laterally transversely move the work table 10 therewith "in" and "out" relative to the machine; and the work table 10, and slide 11 are simultaneously movable along their straight line paths in compound movements thereof, so that, this organization mounts the work table 10 for universal lateral movement in any direction in a fixed horizontal plane by independent and compound movements of the work table 10 and slide 11.

The sensitive table organization, including the work table 10, the slide or sub-table 11, and the supporting base 12 for the slide and work table, is in this instance supported on the horizontally disposed adjustable work table 14 of the duplicator machine by suitably attaching and securing such base 12 to the work table 14 by the usual T bolts or the like 12a (see Fig. 1). It so happens that the duplicator machine of this example is as will be clear by reference to the above identified U. S. Patent 2,005,696, basically of the vertical milling machine type, and the work table 14, as disclosed herein, is a more or less conventional form of work table for such type of machine. The work table 14 is slidably mounted on the usual saddle 15 with the saddle 15 in turn, itself slidably mounted and carried on the upper end of a vertically adjustable knee 16. The saddle 15 is slidably mounted on the knee 16 for manual adjustment in a horizontal plane along a straight line path transversely of the machine, that is, "in" and "out," through the medium of the usual or any other suitable manually operable adjusting mechanism 17. The machine tool table 14 is slidably mounted on the saddle 15 for movement in opposite directions in a horizontal plane along a straight line path at right angles to the path of movement of the saddle 15, by any suitable manually operable adjusting mechanism which includes the usual rotary lead screw operatively associated with the table 14, as indicated at 18, in Fig. 2 of the drawings.

The sensitive work table 10, of the duplicator table organization of the illustrated example hereof, is slidably mounted on the sub-table or slide 11 for movement in a horizontal plane in opposite directions along a straight line path through the medium of the ball bearing or anti-friction slide units 10a which confine the table 10, to its straight line movements with minimum friction, (see Fig. 2). The slide or sub-table 11, is mounted and supported on the base 12, for movement in a horizontal plane in opposite directions along a straight line path at right angles to the path of movement of table 10, through the medium of the ball bearing or anti-friction slide units 11a, similar to the units 10a for the table 10. The details of such ball bearing slide units 10a and 11a, and the mounting of slide 11 on the base 12, and of the work table 10 on the slide 11, are set forth in the above mentioned U. S. Patent 2,005,696, and may be obtained by reference to such patent. Thus, due to the minimum friction slidable mounting of table 10 on slide 11 and of slide 11 on base 12, the table 10, may be universally laterally motioned in a horizontal plane by independent and compound movements of the table 10 and slide 11, with a minimum of friction, so that, the work table 10 may be operated and controlled manually by the application of very small operating forces thereto, with the table extremely sensitively responsive to the applied motioning forces.

The work table 10 is, in this instance, manually operated and controlled through the medium of a manual control organization which includes a single, manual operating and controlling lever 20, having movement reducing and power increasing operative connection with the work table 10. The mounting for the operating lever 20 may include a supporting member 21, that is mounted on the machine in fixed and rigid relationship with respect to the movable table 10 and its movable sub-table or slide 11. The lever 20 is mounted on the supporting member 21, so as to be universally swingable laterally to move the table 10 in the direction the lever 20 is swung. The universal mounting of the lever 20, on the supporting member 21, may include a ball 22 carried by and depending from the lower end of the lever 20, and confined for universal movement in the supporting member 21. The universally mounted lever 20 is connected with the table 10 by an arm 23, secured to the underside of the right hand end of the table 10, and depending therefrom to and having universal connection with a ball 24, carried by the lower end of the arm 23 and spaced above and in vertical axial alignment with the ball 22. The details of such mounting of the manual operating and controlling lever 20 on the supporting member 21, through the medium of the balls 22 and 24 and of the connection of the arm and its mounting with the work table 10 by the arm 23, are disclosed and described in the aforesaid Patent 2,005,696, and need not be repeated herein. It will suffice to state that universal lateral movement of the arm 20 under the manual operation and control of the operator will suitably motion table 10 and slide 11, independently or through simultaneous compound movements thereof, to motion the work table 10 in any desired direction laterally through its horizontal plane of universal movement.

In the example given of such a sensitive type work table organization for a duplicating machine, the work table 10 has mounted and secured thereon, the work piece W and the pattern or master P in proper fixed relationship, so that, the rotary cutter C (see Fig. 1), and the style of the tracer S of the duplicating machine will operatively engage such work piece and pattern, respectively, and as the operator manually moves lever 20 to motion the work table 10 to cause the tracer style to follow the pattern, the cutter C will reproduce the pattern being followed in the work piece W.

In the adaptation of our invention to the sensitive type work table of the illustrated example hereof, we have provided an energy storing and inertia control mechanism or unit to the work table 10, and we have provided a similar energy storing and inertia control mechanism or unit to the slide or sub-table 11. These units are automatically independently operated by independent motioning of the work table and of the slide, respectively, along their straight line paths, and are simultaneously operated by the simultaneous motioning of the work table 10 and the slide 11, through compound movements thereof in the universal lateral motioning of the work table 10 under the manual control of an operation by the control lever 20.

Such an energy storing and inertia control unit as applied to the work table 10, referring now to Fig. 1, of the drawings in particular, includes a screw member 30 in the form of an externally threaded rod or shaft which is mounted in position on the table 10 located at the underside thereof, extending across and between opposite depending side flanges or members 10b of the work table, with the longitudinal axis thereof parallel with the path of straight line movement of the table 10 on and relative to the slide or sub-table 11. The screw 30 is mounted in such position with its opposite ends rotatably journaled in suitable anti-friction bearings 30a, mounted in the opposite side flanges 10b of the table 10, so that the screw 30 is mounted for free, minimum friction rotation on and independently of the table in such bearings, but bodily moved axially or longitudinally with the table as the latter is motioned along its straight line path parallel with the axis of the screw. In this instance, the left hand end of screw 30 (when facing the front of the machine), is extended outwardly a distance beyond the depending left hand flange or hanger member 10b of table 10, to provide the shaft portion 30b for receiving and upon which a suitable flywheel F is fixed for rotation by and with this screw 30. The bearings 30a, thus mount and rotatably support the screw 30 in position confined and limited against axial or radial movement of the screw relative to work table 10, while permitting free rotation thereof on and independently of the table to rotate the flywheel F.

In this example, the screw 30, is provided with external screw threading 31, forming thread grooves 31a therebetween (see Fig. 4), this threading being extended along the length of the screw between the depending flange members or hangers 10b of the frame 10, in which the screw is journaled. A ball bearing nut unit 40, which embodies certain features of our invention, as will be hereinafter explained, is mounted in fixed, non-rotary position at the upper side of the slide or sub-table 11, with the screw 30 operatively received therein and extending therethrough, as will be clear by reference to Fig. 1, of the drawings.

The ball bearing nut unit 40, referring now to Figs. 3, 4 and 5, of the drawings, embodies a nut body or block member 40a, provided with a cylindrical bore 41 therethrough, having internal screw threading 42 formed therein with the helix angle of such threading 42, the same as the helix angle of the external threading 31 on the screw 30. The internal threading 42 of the nut body 40a, provides the usual thread grooves 42a therebetween. The nut body or block 40a may be provided with the laterally extended, horizontal flange portion 40b, by which the nut unit may be attached and secured in position, bores or the like 40c being provided for receiving suitable machine screws for effecting such attachment.

At the lower side of the internally threaded bore 41, of the nut body, the internal threading is interrupted by a groove formed in the body disposed longitudinally and extending from end to end of the bore. A ball return guide or switch plate 44 is seated and secured in such groove with the upper or inner side of such plate 44 being provided with a series of ball return or switching grooves 44a therein, as clearly shown in Fig. 5 of the drawings. The upper surface or face of the switch plate 44 lies in a plane but slightly spaced from the plane passing through the outer edges of the screw threads 31 of the screw 30, when the latter is in operative association in and extending through nut unit 40, so as to provide operating clearance as shown by Figs. 3 and 4 of the drawings in particular.

The ball return or switching grooves 44a, are generally parallel and are disposed angularly across and transversely of plate 44, relative to the internal threading 42 and thread grooves 42a thereof, that is to say, that the switching grooves 44a, are generated as from opposite hand threading to the internal threading 42 of the nut unit 40. The plate 44 is so positioned in the nut body relative to the internal threading 42, that each switching or ball return groove 44a, extends angularly across plate 44, to connect and open at its opposite ends into the adjacent axially spaced portions of what is in effect, one convolution of the thread grooving 42a of the internal threading 42. Each switching or ball return groove 44a thus forms with one convolution of the thread grooving 42a, an endless ball receiving and confining groove around the nut for endless circulation of an independent set of balls therethrough and therearound in either direction. Each switching or ball return groove 44a is cut or otherwise formed in the block 44 so that the groove is of a curved or arcuate form longitudinally thereof to have a depth throughout its length below the plane of the upper or inner surface of plate 44, and of the adjacent plane through which the outer edges of nut threading 42 pass, such as to permit the anti-friction balls b to freely pass back and forth through the switching grooves across and beneath the external threading 31, in the bores of the screw 30. (See Figs. 3 and 4.)

Independent sets of anti-friction balls B1, B2, B3, B4, B5 and B6, as shown by Fig. 4, of the drawings, are provided for meshing the external threading 31 of the screw 30, with the internal threading 42 of the nut body or block 40a, of nut unit 40, to operatively associate and connect the screw 30 with the non-rotary nut unit 40, so that, relative rectilinear movements between the nut unit and screw will be translated into rotary movement of the screw. For instance, in the example hereof, each of the aforesaid independent sets consists of an endless series of anti-friction balls b, mounted in and around one convolution of the thread grooving 42a, of the internal threading 42, with the balls of each series feeding through their own switching or ball return groove 44a, which connects the axially spaced portions of such convolution of the thread grooving. A set of balls b, thus circulates around such convolution of the thread grooving 42a, through the switching groove 44a, in accordance with the direction of circulation or feed of the set of balls caused by the direction of rotation of the screw 30 in the nut unit 40. When the screw 30 is in operative association and mesh with the nut unit 40, the anti-friction balls b of said independent sets B1, B2, B3, B4, B5 and B6, respectively, are seated and engaged in the thread groove 31a of the external threading 31 of the screw, as portions of said screw are successively presented to said independent sets of balls as the screw 30 and nut body 40 move relatively to each other in either direction longitudinally of the screw. Depending upon the direction of rotation of screw 30 and its resulting direction of feed axially through and relative to the nut body 41, each of said sets of balls b, is successively engaged by the external threading of screw 30 with the balls feeding around one side of the helical grooves 42a in the nut threading 42 into a switching groove 44a, for feeding through that groove for return to the other side of the helical groove 42a of the internal threading 42 of nut member 40, in endless succession. The side walls of the switching grooves 44a formed by the switch block 44, are in cooperative association and alignment with the adjacent portions of the internal threading 42 of the nut member and of the external threading 31 of the screw 30, to provide structure which confines the independent sets of balls to their respective allotted helical circulatory paths.

The switching plate 44 is designed so that the switching grooves 44a are of minimum length to minimize the frictional loss of the balls passing through this groove by keeping the number of balls in the groove at any given time to the absolute minimum. The balls passing through groove 44a are not positively rotated as they are while in groove 42a, so that the frictional loss and tendency to jam increases with an increase in the length of groove 44a.

In the adaptation of an energy storing and inertia control mechanism or unit of our invention to a machine tool work table organization of the sensitive type, as in the instant example, rotary motion is imparted to the screw 30, to drive the flywheel F as a result of longitudinal movement of the screw 30, through and relative to the fixed, non-rotary ball bearing nut unit 40, as a result of rectilinear motion of the work table 10 in either direction along its straight line path of movement. With limited space available, it is necessary to utilize a flywheel F of relatively small diameter and small mass. Hence, in order to obtain an effective flywheel effect for efficient energy storing and effective inertia force development by such flywheel, the flywheel must be rotated at a relatively high speed of rotation for relatively small distances of travel or movement of the work table 10. In accordance with our present invention, we have overcome the problems presented by these factors and conditions, by forming the external screw threading 31 of screw 30 of a low helix angle so as to increase the speed ratio of the screw resulting from longitudinal or axial movements thereof through the nut by the rectilinear movement of the table 10. For instance, in the present example, we have provided a helix angle for the external threading 31 of the screw 30 of the order of seven (7) degrees. With such low helix angle for the external threading of the screw in order to cause rotation of the screw when an axial load is applied to the nut, it is necessary to reduce the friction between the screw and nut to a minimum, and such friction reduction in the present instance is accomplished with a high degree of efficiency by the form and design of ball bearing nut of our invention as hereinabove described. In the illustrated example of an application of our energy storing and inertia control mechanism to a machine tool sensitive work table organization, we have, for instance, provided the external threading 31 of the screw 30 of a low helix angle so that one revolution of the screw 30 results from each one-fourth inch (¼") axial movement of the screw by the work table 10 through the ball bearing nut unit 40. In this manner we obtain relatively high speed rotation of the comparatively small diameter flywheel F to store energy and develop inertia forces as a result of normal manual operation of table 10, which will enable practical manual operation and control of the sensitive work table 10 even under the conditions presented by operations on large size work or heavy work material or by the use of large diameter cutting tools.

Thus, with the arrangement as shown, as the work table 10 is motioned along its straight line path on and independently of the slide or subtable 11, by manual operation of the lever 20, the screw 30 is moved longitudinally with the table along such path and through the fixed, non-rotary ball bearing nut unit 40. As the screw 30 moves through such nut unit 40, due to the low helix angle of the threading 31 and of the arrangement of independent sets of anti-friction balls b, the longitudinal movement of the screw is translated into relatively high speed rotation thereof to rotate the flywheel F as an energy storing and inertia control element. Such high speed rotation of flywheel F is obtained with a minimum of added manual force required from the operator in motioning the hand lever 20, while a high rate of speed of rotation of the flywheel is quickly attained. The energy stored in flywheel F is then applied by the screw and nut arrangement and associated mounting thereof with work table 10 in the direction of movement of the table to aid the operator in manually feeding a cutter through a work piece on the table, while the substantial inertia forces developed continuously act to maintain a constant rate of speed of movement of table 10 along its rectilinear path and to resist sudden changes or variations in such rate of speed.

In carrying out the adaptation of our invention to the particular sensitive type work table of this example, we operatively mount and associate an energy storing and inertia control mechanism or unit of the invention with the slide or sub-table 11 for automatic actuation thereby in the normal operation of the slide 11. Referring now to Fig. 2 of the drawings, such as a unit may be similar to the unit combined and associated with the work table 10, as hereinbefore described, and embody an externally threaded screw 30' mounted in position beneath the slide and journalled for rotation thereon at its opposite ends in the anti-friction bearings 30a mounted in the opposite side depending flange or hanger members 11a of the slide 11. The screw 30' is mounted in horizontally disposed position with its longitudinal axis parallel with the straight line path of movement of the slide 11 on the supporting base 12. As the path of movement of the slide 11 is disposed at right angles to the path of movement of the table 10 which is slidably mounted on the slide, it follows that the screw 30' of the energy storing mechanism for the slide 11 is mounted and disposed with its longitudinal axis at right angles to the longitudinal axis of the screw 30 of the energy storing mechanism for the table 10. The screw 30' is extended outwardly at one end thereof (the left hand end when facing the right hand side of the machine as in Fig. 2) to provide a shaft 30b for mounting a flywheel F'' which is suitably keyed or secured thereon for rotation by rotation of the screw 30' and the extension shaft 30b thereof.

A ball bearing nut unit 40', similar to the ball bearing nut unit 40 of the energy storing mechanism for the work table 10, is positioned at the upper side of the base 12 secured in fixed non-rotary position thereon with the screw 30' received therein and extending therethrough in operative mesh and engagement therewith through the medium of the independent sets of anti-friction balls b constructed, arranged and assembled as hereinbefore described in connection with the ball bearing nut 40. In this example the external threading 31 of screw 30' has the low helix angle such as described in connection with the helix angle of the external threading 31 on the screw 30, in order to obtain high speed of rotation of the screw 30' and flywheel F'' for small movements of the slide 11 along its straight line path of movement. Thus, as the slide 11 is motioned through its rectilinear movements, the screw 30' is moved longitudinally through the ball bearing nut unit 40' and the medium of the independent sets of balls b, meshing the external threading 31 of screw 30' with the internal threading 42 of the ball bearing nut unit 40', such longitudinal screw movements are translated into relative high speed rotation of the screw and of the flywheel F'' so as to store energy in that flywheel and develop inertia forces, all functioning and reacting on the slide 11 to aid rectilinear movements thereof and to tend to control and maintain constant the rate of speed of such movements by resisting sudden speed changes.

In the normal operation of the sensitive table organization of this example, as the work table 10 is universally laterally motioned through manual operation and control of the hand lever 20, the slide 11 and the table 10 may be independently motioned along their respective straight line paths of movement at right angles to each other or may be simultaneously motioned through compound movements thereof. When the work table 10 is motioned along its straight line path independently of and without movement of the slide 11, the table is under the control of the energy storing and inertia force developing flywheel F, with the flywheel F' of the energy storing mechanism associated with slide 11 at rest and inactive. When the slide 11 is motioned along its straight line path at right angles to the path of movement of table 10, to bodily, laterally motion the table "in" and "out" relative to the machine, but without movement of the table independently of or relative to slide 11, the screw 30' associated with slide 11 is actuated to rotate flywheel F' and such flywheel then stores energy and effects inertia control of the combined movement of the slide 11 and the work table 10 as a unit. Under such conditions the flywheel F is at rest and inactive. When the slide 11 and work table 10 are simultaneously motioned along their respective straight line paths through compound movements thereof by the manual operation of the lever 20, the movements of slide 11 actuate its inertia controlling flywheel F', and simultaneously the movement of the table 10 relative to slide 11 causes the screw 30 to actuate its flywheel F, so that the table 10 and slide 11 are under the control of the combined energy storing functions of and inertia forces developed by the simultaneously actuated flywheels F and F'.

In order that an energy storing and inertia control unit of our invention may be readily adapted to meet varying conditions presented by different characters of work being performed by a work table organization such as the sensitive type example of such an organization herein disclosed and explained, we have provided flywheel designs and constructions by which the inertia effect of a flywheel may be changed by varying the mass thereof and the location of the mass radially from the axis of rotation of the flywheel. In one form of such a flywheel as shown by the flywheels F and F' of Figs. 1 and 2, the flywheel is formed of a series of discs f of varying diameters which are removably mounted on the flywheel shaft. The inertia effect of a flywheel of this form can be changed by adding or removing discs f to or from the flywheel.

In another form of such variable inertia effect flywheel, as shown in Figs. 6 and 7 of the drawings, the flywheel includes a tubular hub member 50 which may be suitably keyed or attached to the driving shaft, with a rod 51 secured extended diametrically through hub 50 and extending radially outwardly from opposite sides thereof. The rod 51 is rotatably mounted in and extending through the hub 50 for rotation independently of the hub and may be confined against axial or longitudinal movements through the hub by suitable washers or the like elements 51a secured on and to the shaft at and having bearing engagement with hub 50 at opposite sides, respectively, of such hub. The opposite outer lengths of the rod 51, which extend radially outwardly from opposite sides of the hub 50, are provided with opposite hand external screw threading 51b and 51c, respectively. Knurled thumb nuts 52 are secured to opposite ends of the rod 51 for manually rotating the rod in either direction in the hub 50.

Weights 53 and 54 in the form of circular blocks having internally threaded axial bores therethrough are threaded on the externally threaded opposite lengths of rod 51, respectively. Weight 53 is provided with a slide arm 53a extending inwardly to the hub 50 from the outer peripheral side of the weight with the inner surface of this arm slidably engaging a flat 50a formed on the adjacent side of the hub 50. The weight 54 is formed with a similar slide arm 54a which extends inwardly therefrom to the hub and has the inner surface thereof engaging a flat 50b at the adjacent side of the hub opposite the side on which the flat 50a is formed for slidably engaging arm 53a of weight 53.

By the foregoing arrangement, the weights 53 and 54 may be simultaneously moved inwardly or outwardly to adjust their radial distances from the hub 50, by rotating rod 51 in one direction or the other, the weights 53 and 54 being held against rotation on and relative to rod 51 by the arms 53a and 54a slidably engaging the flats 50a and 50b, respectively, at opposite sides of the hub. In this manner the inertia effect of this form of flywheel may be readily varied with accuracy in order to develop inertia forces suitable to various conditions of operation.

Attention is directed to the fact that while we have disclosed a form of ball bearing nut of our invention herein, such as the ball bearing nut units 40 and 40', and prefer the use of such form of nut for efficiency reasons, yet it is to be understood that various other forms of ball bearing nuts and ball bearing nut and screw arrangements may be employed in the broad combinations of our invention in the adaptation thereof to the inertia control of machine tool work tables or other machine elements. Our invention further contemplates and includes the use of ball bearing nut and screw arrangements embodying the principles and features of the invention, in any combination and for any use for which they are or may be adapted other than in the combination with a machine tool work table presented herein as an example; and particularly in those combinations or for those uses in which it may be desired to translate relative rectilinear movements between the screw and nut in directions longitudinally of the screw, into relatively high speed rotary motion of the screw for relatively small rectilinear movements between the screw and nut in directions longitudinally of the screw.

It will also be evident to those skilled in the art that various changes, modifications, substitutions and eliminations might be resorted to without departing from the spirit and scope of our invention and, hence, we do not wish to limit the invention in all respects to the exact and specific disclosures of the examples of the invention described herein, except as may be required by specific intended limitations thereto included in any of the appended claims.

What we claim is:

1. In a machine tool, in combination, a work table organization of the sensitive table type including a supporting structure, a slide member mounted on said supporting structure for movement thereon in opposite directions along a straight line path, a screw member rotatably mounted on and carried by said slide member with its axis parallel to the straight line path of movement of said slide member, a flywheel on said screw member for rotation thereby, a nut member mounted on said supporting structure in operative engagement with said screw member and being fixed relative to movements of said slide and screw members for causing rotation of the screw member and of said flywheel by movements of said slide member in either direction along its straight line path, a work table mounted on and carried by said slide member for movement in opposite directions independently thereof, along a straight line path at right angles to the straight line path of movement of said slide member, a screw member rotatably mounted on and carried by said work table with its longitudinal axis parallel with the straight line path of movement of said table, a flywheel mounted on said screw member for rotation thereby, a nut member mounted on said slide member in operative association with said table carried screw member and being fixed relative to movements of said table on said slide member for causing rotation of said screw member and flywheel by the straight line movements of said table, and manually operable means coupled with said slide member and said table for universal lateral motioning of said table by selective independent movements or compound movements of said slide member and said work table.

2. In a machine tool, in combination, a work table organization including a supporting structure, a movable element on said supporting structure, mounting means supporting said movable element on said structure for and confining said element to rectilinear movements in opposite directions along a straight line path, manually operable means coupled with said movable element for manually motioning the same in either direction along its straight line path of movement, an externally threaded screw member rotatably mounted on and carried by said movable element, said screw member being positioned with its longitudinal axis parallel to the straight line path of motioning of said movable element, a threaded ball bearing type nut member mounted on said supporting structure in fixed position relative to the rectilinear movements of said element, said screw member being in operative threaded engagement with said nut member for causing rotation of said screw member by axial movement thereof relative to said nut member, the external threading of said screw member being of low helix angle for causing relatively high speed rotation of said screw member for relatively short distances of rectilinear movement of said movable element, and a weight mass mounted on said screw member for rotation thereby to store energy and apply inertia forces to said movable element during manual motioning thereof.

3. In a machine tool, in combination, a work table organization including a supporting structure, a movable element on said supporting structure, mounting means supporting said movable element on said structure for and confining said element to rectilinear movements in opposite directions along a straight line path, manually operable means coupled with said movable element for manually motioning the same along its straight line path of movement, a screw member rotatably mounted on and carried by said movable element, said screw member being mounted in position with its longitudinal axis parallel to the straight line path of motioning of said movable element, a ball bearing type nut member mounted on said supporting structure in fixed position relative to the rectilinear movements of said movable element, said screw member being in operative threaded engagement with said nut member and being provided with external threading having a low helix angle for causing rotation of said screw member by axial movement thereof relative to said nut member, and a flywheel mounted on said screw member for rotation thereby to store energy and apply inertia forces to said movable element during manual motioning thereof.

THEODORE MILLER.
AAGE JENSEN.
RAYMOND E. OVERTURF.

REFERENCES CITED

The following references are of record in the file of this patent:

UNITED STATES PATENTS

| Number | Name | Date |
|---|---|---|
| 1,374,460 | Lungstrom | Apr. 12, 1921 |
| 1,967,482 | Schmidt | July 24, 1934 |
| 2,298,011 | Hoffar | Oct. 6, 1942 |
| 2,370,882 | Serna | Mar. 6, 1945 |

FOREIGN PATENTS

| Number | Country | Date |
|---|---|---|
| 353,992 | Italy | Nov. 6, 1937 |